US007499848B2

(12) United States Patent
Irons

(10) Patent No.: US 7,499,848 B2
(45) Date of Patent: Mar. 3, 2009

(54) SCRIPTING SUPPORT FOR AN EMULATOR

(75) Inventor: Darren Scott Irons, Carrollton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 332 days.

(21) Appl. No.: 11/017,032

(22) Filed: Dec. 20, 2004

(65) Prior Publication Data

US 2006/0136191 A1    Jun. 22, 2006

(51) Int. Cl.
*G09B 25/00* (2006.01)
*G09B 5/00* (2006.01)
(52) U.S. Cl. ................... 703/23; 703/24; 434/201; 434/379
(58) Field of Classification Search ........... 703/24, 703/23; 434/379, 118, 129, 128, 188, 201, 434/365, 202, 314
See application file for complete search history.

(56) References Cited

U.S. PATENT DOCUMENTS 4,277,827 A * 7/1981 Carlson et al. ............ 703/24
4,649,499 A * 3/1987 Sutton et al. ............ 345/419
4,868,376 A * 9/1989 Lessin et al. ............ 235/492
2001/0035913 A1* 11/2001 Shtyrenkov ............ 348/552

OTHER PUBLICATIONS

"Graphing calculator may revolutionize math teaching", The Oregonian, Portland. Feb. 28, 1991. p. b.2.*

* cited by examiner

*Primary Examiner*—Paul L Rodriguez
*Assistant Examiner*—Nithya Janakiraman
(74) *Attorney, Agent, or Firm*—Mirna Abyad; Wade J. Brady, III; Frederick J. Telecky, Jr.

(57) ABSTRACT

An emulation system that allows a user to create a script is provided. The emulation system emulates a handheld computing device, such as a calculator, on an electronic device such as a personal computer. The script, which includes an input sequence, may be recorded and played back at a later time. In a preferred embodiment, annotations may be added to the script to help explain the concepts being illustrated by the script. The annotation may include text, graphics, audio, and/or video. Upon playback, the input sequence recorded in the script is used as input to the emulator. The playback may be automated or performed one step at a time, thereby allowing the student to step through the script and study intermediate results. The input sequence may represent, for example, digits, commands (e.g., store, recall, graph, list, print, etc.), or functions (e.g., $x^2$, $x^3$, compute, tan, sin, cos, etc.).

20 Claims, 13 Drawing Sheets

SCRIPTING SUPPORT FOR AN EMULATOR

CROSS-REFERENCE TO RELATED APPLICATIONS

This application relates to the following co-pending and commonly assigned patent applications: Ser. No. 11/017,082, filed Dec. 20, 2004, entitled Device Controller for an Emulator; and Ser. No. 11/017,027, filed Dec. 20, 2004, entitled Emulator with Key Press History, which applications are hereby incorporated herein by reference.

TECHNICAL FIELD

The present invention relates generally to emulators and, more particularly to providing scripting capabilities to end users of an emulator of a handheld computing device.

BACKGROUND

Electronic calculators have become a common tool for teaching students various aspects of mathematics. In particular, the features of graphing calculators are particularly advantageous in a classroom setting to teach students mathematical principals and to illustrate practical applications of concepts taught in class. In fact, many schools now recommend or require students in math classes to use graphing calculators to aid students in learning about advanced math topics, such as trigonometry and calculus.

To aid teachers in a classroom setting, emulators have been developed to emulate the functions and display of the calculators on a computer, such as a desktop computer, a laptop computer, or the like, equipped with a display. Emulators typically comprise a graphical user interface (GUI) that illustrates a graphical representation of the physical calculator. Data is entered and functions are controlled by either clicking on specific keys of the graphical representation or using a keyboard to enter the desired data/commands.

During a typical use, a teacher is in front of the computer to control the emulator. The computer running the emulator is coupled to a projector such that the GUI display of the emulator is projected on a screen or other surface, thereby allowing students to watch the teacher illustrate mathematical concepts using the calculator. Another use of an emulator is in conjunction with an electronic whiteboard. This allows the computer to be projected onto the screen and allows the user to "drive" the emulator which is being projected.

At times, however, the student requires assistance with the use of the calculator and/or emulator outside of regular class time or other times when the teacher is unavailable. In these situations, the student must rely on notes taken during class, memory, and trial and error to determine how to use the calculator/emulator to solve problems. This problem is particularly troublesome in situations in which a student has missed one or more class periods or if the teacher wishes to provide additional examples to students. Hence, there is a need for a way to illustrate the use of a calculator or emulator to demonstrate a mathematical concept.

SUMMARY OF THE INVENTION

These and other problems are generally solved or circumvented, and technical advantages are generally achieved, by preferred embodiments of the present invention which provides a scripting capability for an emulator of a handheld computing device.

In accordance with an embodiment of the present invention, an emulation system is provided. The emulation system comprises a processor configured to perform mathematical operations available on a handheld computing device, a display communicatively coupled to the processor, and memory communicatively coupled to the processor. The memory is further configured to store computer program code to cause the processor to record a script as an input sequence is entered on the emulation system, play the script, and emulate behavior of the handheld computing device in accordance with playing of the script. The handheld computing device may be, for example, a calculator or an electronic device configured to emulate a calculator.

In accordance with another embodiment of the present invention, a method of emulating a handheld computing device is provided. The method comprises the steps of recording a script as an input sequence is entered on an emulation system, playing the script, and emulating behavior of the handheld computing device in accordance with playing of the script.

In accordance with yet another embodiment of the present invention, a computer program for emulating a handheld device is provided. The computer program includes computer program code for recording a script, playing the script, and emulating behavior of the handheld computing device in accordance with playing of the script.

It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The following is a brief description of the drawings, which illustrate exemplary embodiments of the present invention and in which.

DETAILED DESCRIPTION OF ILLUSTRATIVE EMBODIMENTS

Figure 1:
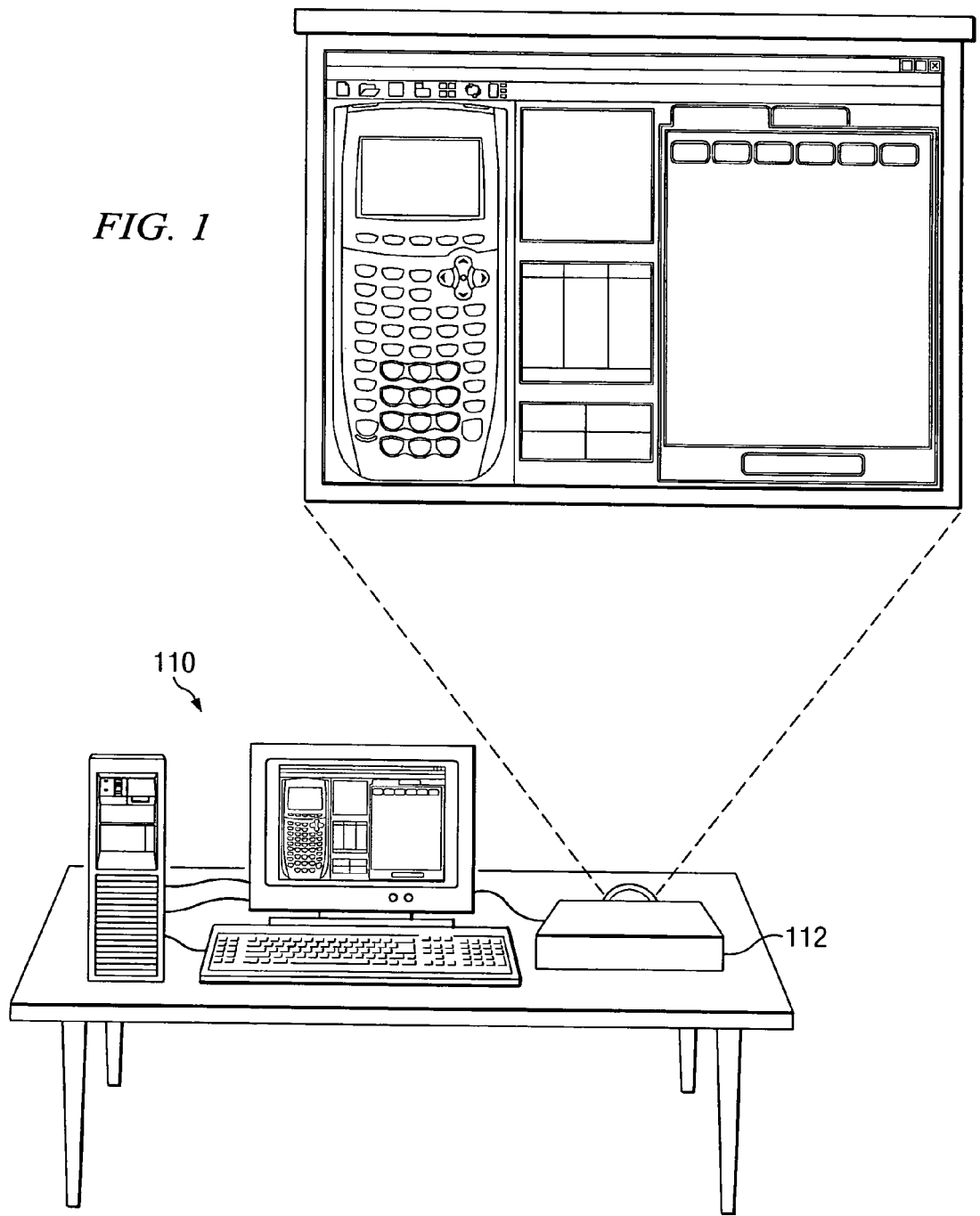
FIG. 1 illustrates an emulation system in accordance with an embodiment of the present invention.

Referring now to the drawings, wherein like reference numbers are used herein to designate like or similar elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Embodiments of the present invention are discussed below with respect to an embodiment utilizing a graphing calculator. It should be noted, however, that embodiments of the present invention may be useful for emulations of any electronic device, particularly handheld computing devices. Examples of other types of handheld computing devices in which embodiments of the present invention may be useful include calculators with a multi-line screen, scientific calculators, advance calculators able to upload and run software applications, handheld-sized limited-purpose computer devices, handheld-sized educational computer devices, handheld-sized portable computer devices having a multi-line screen, portable computer devices having a video screen, personal digital assistants (PDA), palmtop computers, handheld computing devices with a touch screen interface, personal communicators, personal intelligent communicators, cellular or mobile telephones having a multi-line screen, global positioning system (GPS) devices, portable inventory logging computer devices having a multi-line screen (as may be used by courier deliverers, for example), handheld monitoring devices having a multi-line screen (as may be used by meter readers, for example), handheld parking ticket administering devices having a multi-line screen, handheld portable email computer devices having a multi-line screen, handheld portable Internet browsing devices, handheld portable gaming devices, and any combination thereof.

Embodiments of the present invention may be particularly useful in a classroom setting wherein a teacher is utilizing an emulation system to demonstrate mathematical concepts on a calculator, such as a graphing calculator, a scientific calculator, a financial calculator, a programmable calculator, other calculators, or the like. In these embodiments, the handheld computing device may include a calculator or an electronic device configured to emulate a calculator.

Referring first to FIG. 1, an embodiment of the present invention provides an emulation system 110 communicatively coupled to a projector 112, wherein the emulation system 110 emulates a handheld computing device (not shown). The handheld computing device may be any electronic computing device, such as a calculator. For example, in a preferred embodiment the handheld computing device is a graphing calculator such as the TI-84 Plus graphing calculator manufactured by Texas Instruments, Inc., of Dallas, Tex. The TI-84 Plus is a popular graphing calculator used in $6^{th}$-$12^{th}$ grades to illustrate various mathematical concepts. Other types of devices, however, may be used.

The emulation system 110 may comprise a general purpose computing device, such as a personal computer, a mini-computer, a main frame, a personal data assistant, a laptop computer, or the like, having a display attached thereto. The emulation system is described in greater detail below with reference to FIG. 3.

In operation, as illustrated in FIG. 1, a user (in most cases a teacher) may initiate the emulator on the emulation system 110 during classroom lectures. The emulation system 110 preferably provides a graphical user interface (GUI) comprising a graphical representation of the handheld computing device, e.g., a calculator. The user controls the operation of the emulation in order to illustrate a function of the calculator and/or to illustrate a mathematical concept. As the user controls the emulator on the emulation system 110, the graphical representation of the calculator is enlarged and displayed on a large surface, such as a screen or wall, via the projector 112. In this manner, the user may use the emulation system 110 to demonstrate the use of the handheld computing device and mathematical concepts.

Figure 2:
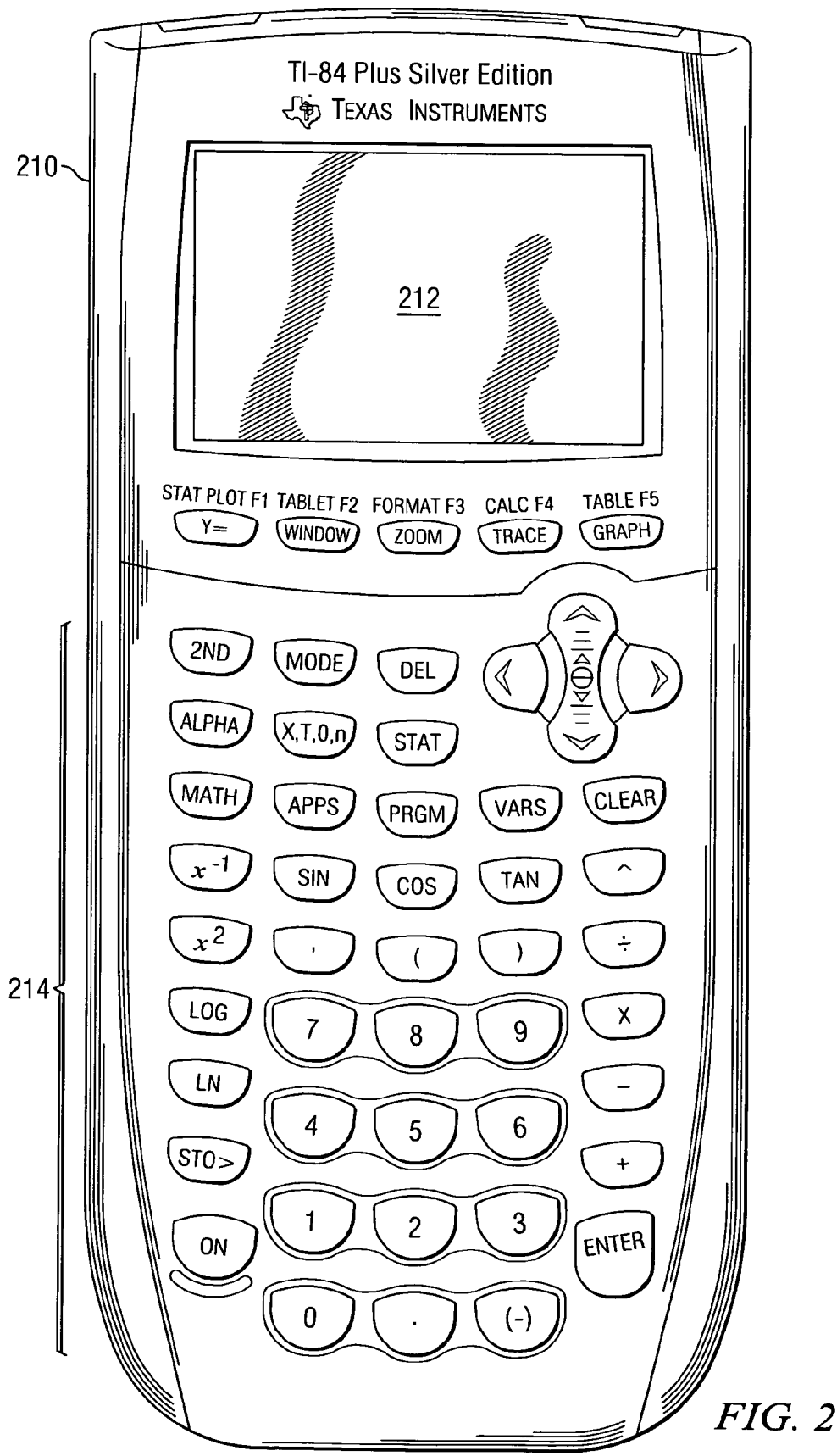
FIG. 2 illustrates an example of a handheld computing device in accordance with an embodiment of the present invention.

Referring now to FIG. 2, an example of a handheld computing device 210 in accordance with an embodiment of the present invention is shown. For illustrative purposes only, the handheld computing device 210 illustrated in FIG. 2 is similar to a TI-84 Plus graphing calculator.

As shown in FIG. 2, the handheld computing device 210 includes a graphical display 212 and a set of keys 214. The graphical display 210 provides a means upon which graphs of various functions and/or one or more lines of text/symbols may be displayed. The graphical display 212 may be, for example, an LED display. The set of keys 214 is located below the graphical display 212 and provide a method for a user, e.g., a student, to enter data and functions. Other configurations and functions may be used.

Figure 3:
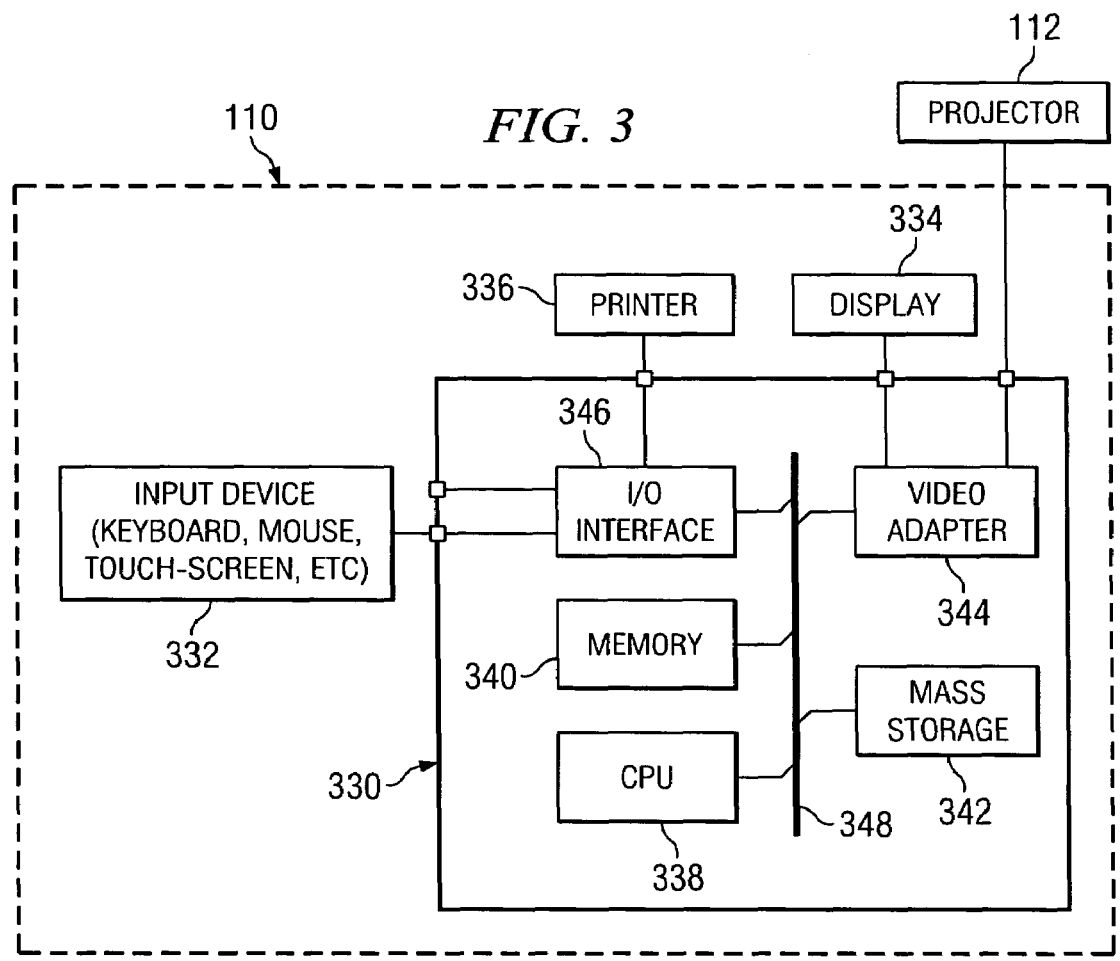
FIG. 3 is a block diagram of an emulation system in accordance with an embodiment of the present invention.

FIG. 3 is a block diagram of the emulation system 110 in accordance with an embodiment of the present invention. Generally, the emulation system 110 may comprise a processing unit 330 equipped with one or more input devices 332 (e.g., a mouse, a keyboard, or the like), and one or more output devices, such as a display 334, a printer 336, or the like. The processing unit may be, for example, a desktop computer, a workstation, a laptop computer, a personal digital assistant, a dedicated unit customized for a particular application, or the like.

Preferably, the processing unit 330 includes a central processing unit (CPU) 338, memory 340, a mass storage device 342, a video adapter 344, and an I/O interface 346 connected to a bus 348. The bus 348 may be one or more of any type of several bus architectures including a memory bus or memory controller, a peripheral bus, video bus, or the like. The CPU 338 may comprise any type of electronic data processor. For example, the CPU 338 may comprise a Pentium™ processor from Intel Corp., an Athlon processor from Advanced Micro Devices, Inc., a Reduced Instruction Set Computer (RISC), Application-Specific Integrated Circuit (ASIC), or the like. The memory 340 may comprise any type of system memory such as static random access memory (SRAM), dynamic random access memory (DRAM), synchronous DRAM (SDRAM), read-only memory (ROM), a combination thereof, or the like. In an embodiment, the memory 340 may include ROM for use at boot-up, and DRAM for data storage for use while executing programs.

The mass storage device 342 may comprise any type of storage device configured to store data, programs, and other information and to make the data, programs, and other information accessible via the bus 348. In a preferred embodiment, the mass storage device 342 is configured to store the emulation program to be executed by the CPU 338. The mass storage device 342 may comprise, for example, one or more of a hard disk drive, a magnetic disk drive, an optical disk drive, or the like.

The video adapter 344 and the I/O interface 346 provide interfaces to couple external input and output devices to the processing unit 330. As illustrated in FIG. 3, examples of input and output devices include the display 334 coupled to the video adapter 344 and the mouse/keyboard 332 and the printer 336 coupled to the I/O interface 346. Other devices may be coupled to the processing unit 330.

The processing unit 330 may also include a network interface (not shown) and/or a wireless interface (not shown). The network interface allows the processing unit 330 to communicate with remote units via a network (not shown). In an embodiment, the processing unit 330 is coupled to a local-area network or a wide-area network to provide communications to remote devices, such as other processing units, the Internet, or the like. The network interface may provide an interface for a wired link, such as an Ethernet cable or the like, or a wireless link.

It should be noted that the emulation system 110 may include other components. For example, the emulation system 110 may include power supplies, cables, a motherboard, removable storage media, cases, and the like. These other components, although not shown, are considered part of the emulation system 110.

It should also be noted that the emulation system 110 may be coupled to the handheld computing device 210 via a wireless or wired connection. In this manner, the handheld computing device 210 may be used as an input device, thereby allowing the user to move around the classroom. Communicatively coupling the handheld computing device 210 to the emulation system 110 is discussed further in co-pending U.S. patent application Ser. No. 11/017,082, which is incorporated herein by reference.

The functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise. In other embodiments, however, a hardware system may be specifically designed to perform one or more of the functions described herein.

Figure 4:
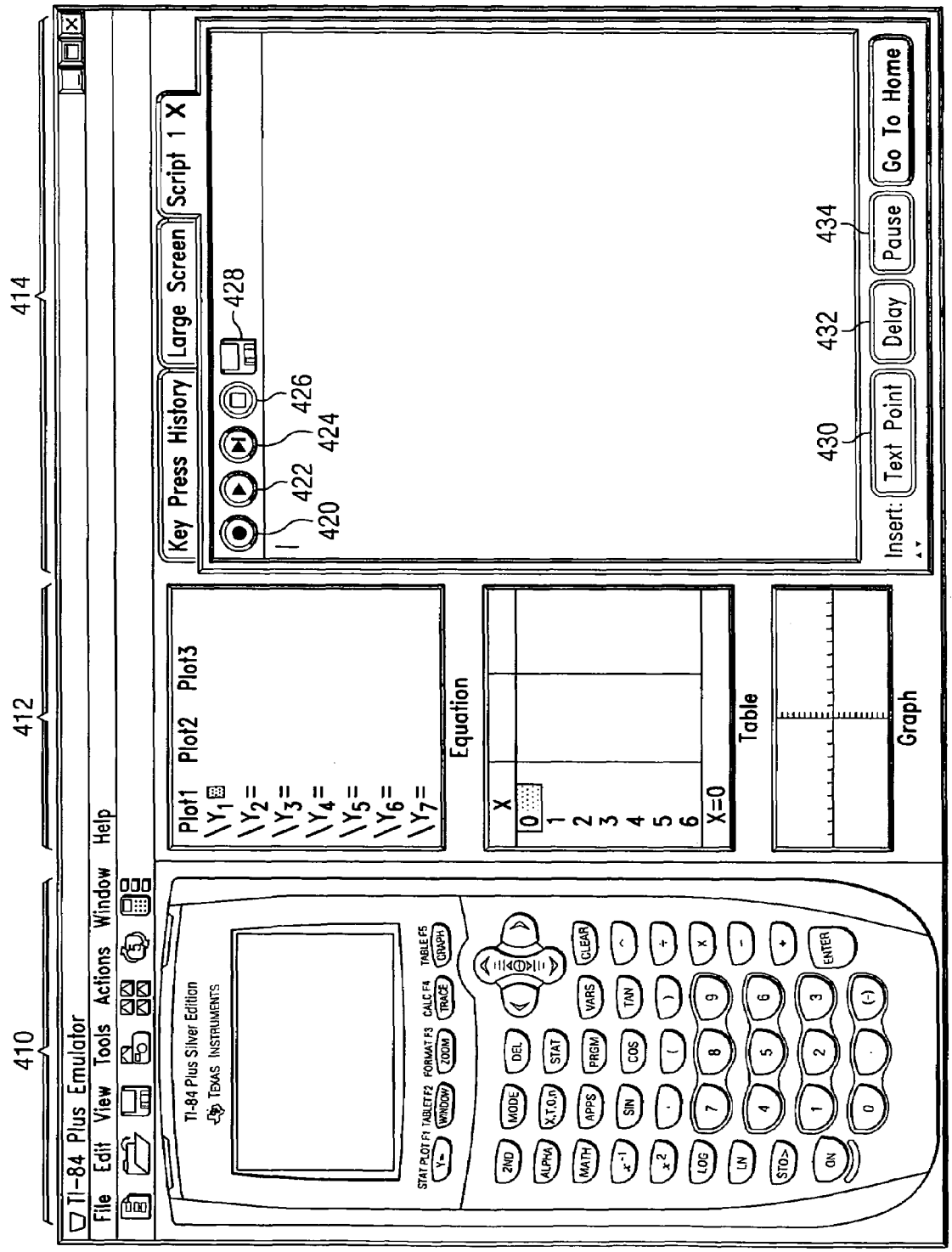
FIG. 4 is an example of a user-interface that may be used in conjunction with the emulation system in accordance with an embodiment of the present invention.

FIG. 4 is a display 400 generated by the emulation system 110 in accordance with an embodiment of the present invention. Generally, the display 400 includes a calculator-representation section 410, a calculator-display section 412, and a scripting section 414. The calculator-representation section 410 comprises a graphical representation of the handheld computing device 210 that the emulation system 110 emulates. For example, if the handheld computing device 210 is the TI-84 Plus calculator, illustrated in FIG. 2, then the calculator-representation section 410 displays a graphical representation of the TI-84 Plus calculator. By displaying a graphical representation of the actual physical device, the students are able to easily relate the use of the emulator to the actual device.

The calculator-display section 412 illustrates the display that would be presented on the handheld computing device 210 if the data/functions entered on the emulation system 110 were entered on the handheld computing device 210. The display may include text, graphs, prompts, charts, plots, or the like.

The scripting section 414 provides a section in which a script may be created, displayed, or played. As illustrated in FIG. 4, the scripting section 414 includes buttons to control the creation and playback of scripts, namely, the scripting section 414 includes a record button 420, a play button 422, a step-through button 424, a stop button 426, and a save button 428.

The record button 420 allows the user, e.g., a teacher, to begin recording an input sequence, and the stop button 426 may be used to stop recording the input sequence. In operation the user selects the record button 420, and thereafter, the input sequence entered by the user are recorded, wherein the input sequence may include, for example, keystrokes, mouse clicks, button positions, switch positions, or combinations thereof. For example, the input sequence may be entered by clicking on a key of the graphical display of the handheld device in the calculator-representation section 410, entering a key on a keyboard or other input device, entering a key on a handheld device (e.g., the calculator being emulated) coupled to the emulation system, or the like. Preferably, each element of the input sequence is displayed in the scripting section 414 as the elements are being entered.

The play button 422 allows the user to cause the script to be performed. While the script is being performed, it is preferred that the key within the scripting section 414 be highlighted or otherwise identified as the key being entered and/or performed. Furthermore, it is also preferred that the corresponding key of the graphical representation of the calculator being emulated within the calculator-representation section 410 also be highlighted. Highlighting may include one or more of bolding, changing color, 3-D graphics, flashing, reverse color, a progress bar, or the like.

In addition to the play button 422, the emulation system 110 preferably provides the ability to step through a script one element at a time via the step-through button 424. This provides the additional advantage of allowing the student to study the intermediate results, further enhancing the learning experience.

The save button 428 allows the script to be saved to a storage medium, such as a floppy drive, memory, removable memory, or the like. Once saved, the script may be recalled at a later time and/or distributed to students or other users. One method of recalling the script at a later time is through the use of the file commands provided by Microsoft Windows operating system, manufactured by Microsoft Corporation.

Additional functions that are preferably available include commands that allow a user to annotate the script, add a delay during playback of the script, or to pause the playback of the script, as illustrated by buttons 430, 432, and 434, respectively. The ability to add comments or otherwise annotate the scripts allows the user to explain the script and functions being performed or about to be performed. Preferably, the annotation may be located before or after any keystroke, thereby allowing the user to place the annotation at the most relevant location. The annotation may comprise text, graphics, audio, video, or the like. In the embodiment illustrated in FIG. 4, annotation may be added by selecting the Text Point button 430 while recording a script. The annotation feature is illustrated in greater detail below.

The Delay button 432 allows the user to insert a delay for a predetermined amount of time in the script being recorded. By inserting a delay, the user may delay the playing of the remainder of the script to allow the student to study the results and comprehend the functions being performed before proceeding. For example, a delay may be entered after a graph is created to provide the student time to examine and comprehend the graph before proceeding with the next step.

The Pause button 434 allows the user to pause the playing of the script. This function is similar to the delay function discussed above except that the pause function requires the student to perform an action, such as selecting the play button 422 before playback of the script is resumed. This function provides the student additional time to study the script and the results of playing the script.

Figure 5:
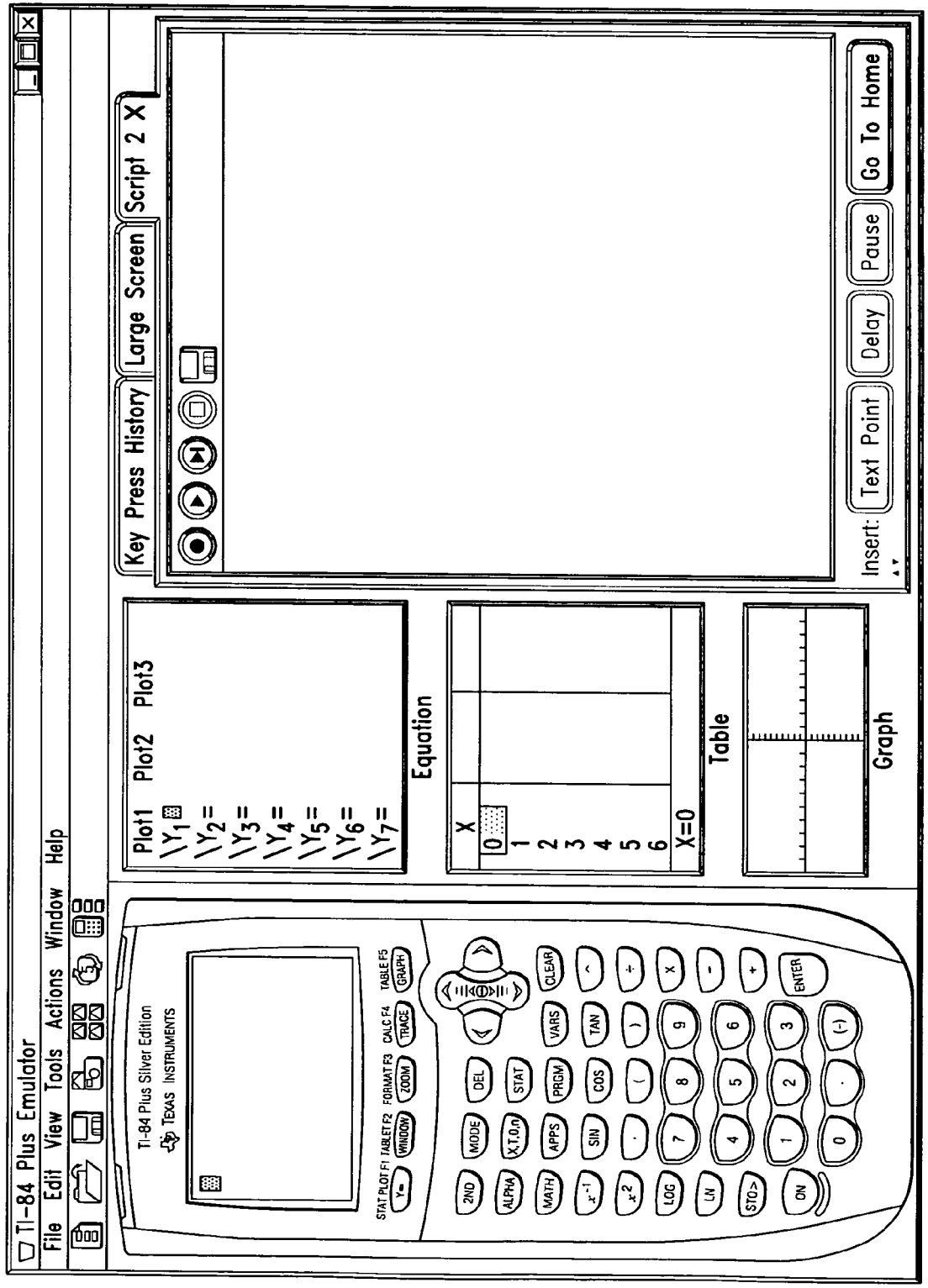
FIGS. 5-13 are a series of screen shots that an emulation system may utilize to provide a scripting capability in accordance with an embodiment of the present invention.
Figure 6:
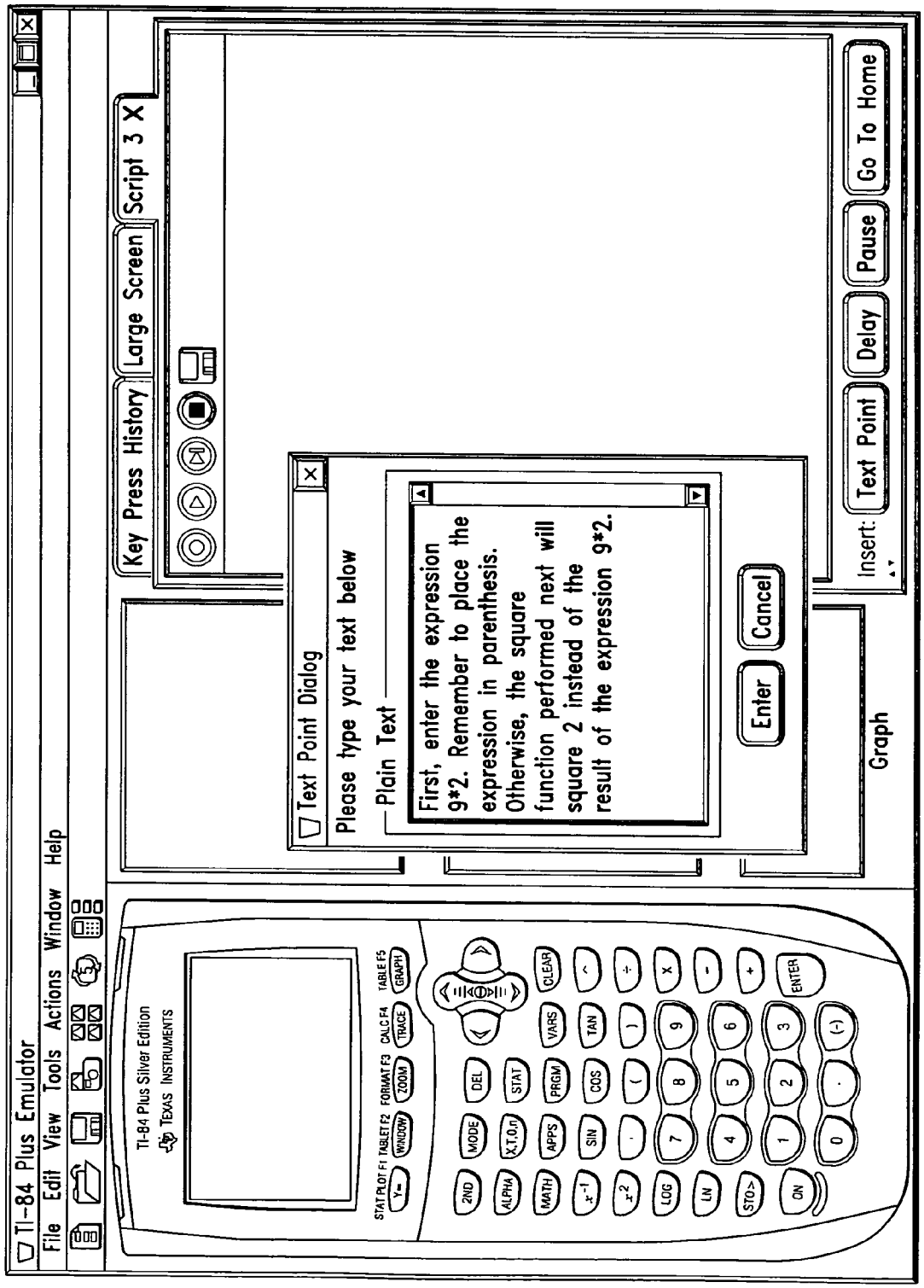

FIGS. 5-10 illustrate a series of screen shots that illustrate an example of an embodiment of the present invention in which a script is recorded and saved. Referring first to FIG. 5, a new script is selected to be recorded. At this point, the record button 420 is enabled to allow the user to begin recording a script. In FIG. 6, annotation is added to describe to the student the functions to be entered and any other notes that the teacher believes to be useful to the student. In this example, the teacher enters, "First, enter the expression 9*2. Remember to place the expression in parenthesis. Otherwise, the square function performed next will square 2 instead of the result of the expression 9*2." Note that after the record button 420 was selected, the Text Point button 430 was enabled to allow the text to be entered.

Figure 7:
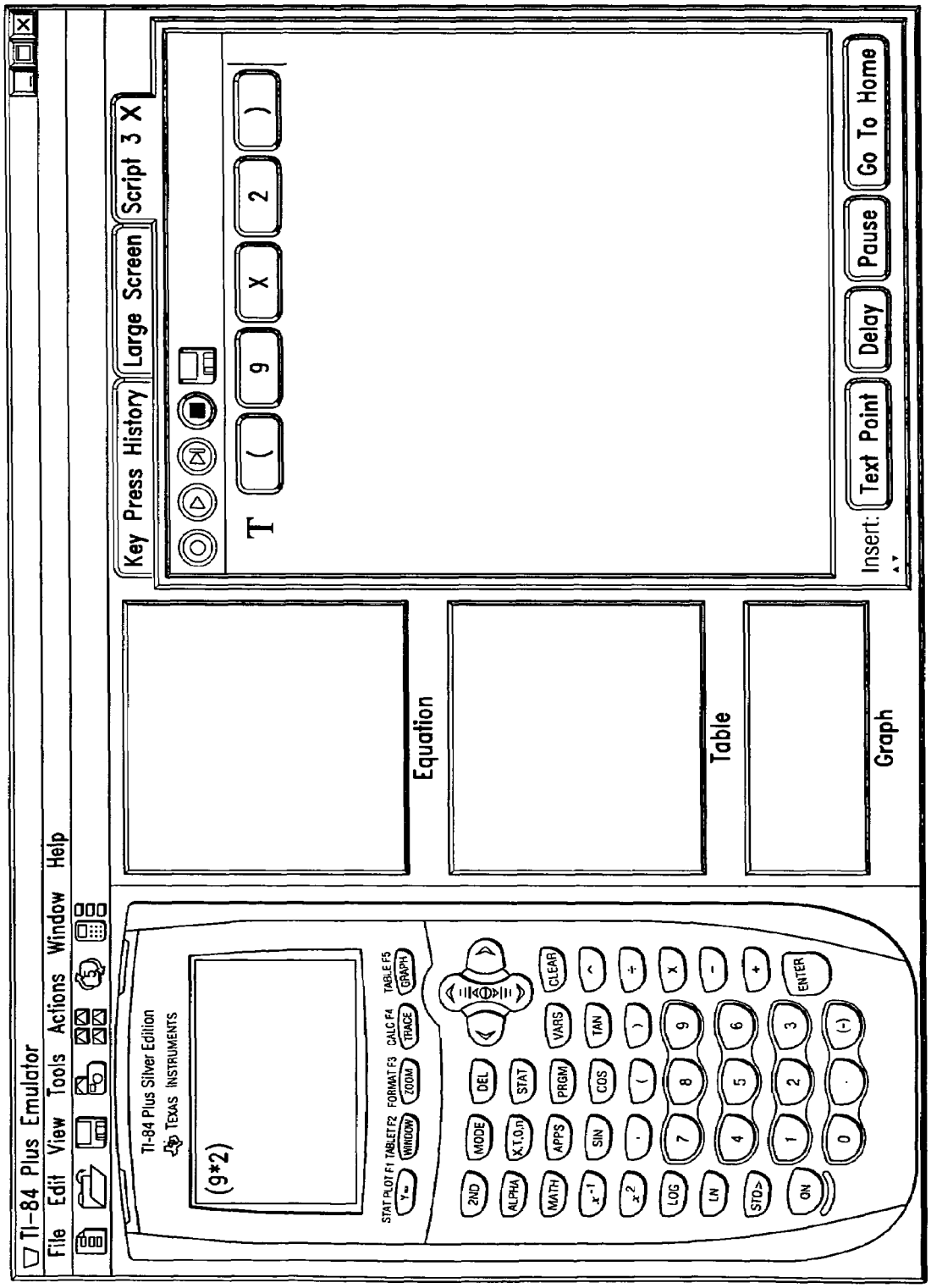
Figure 8:
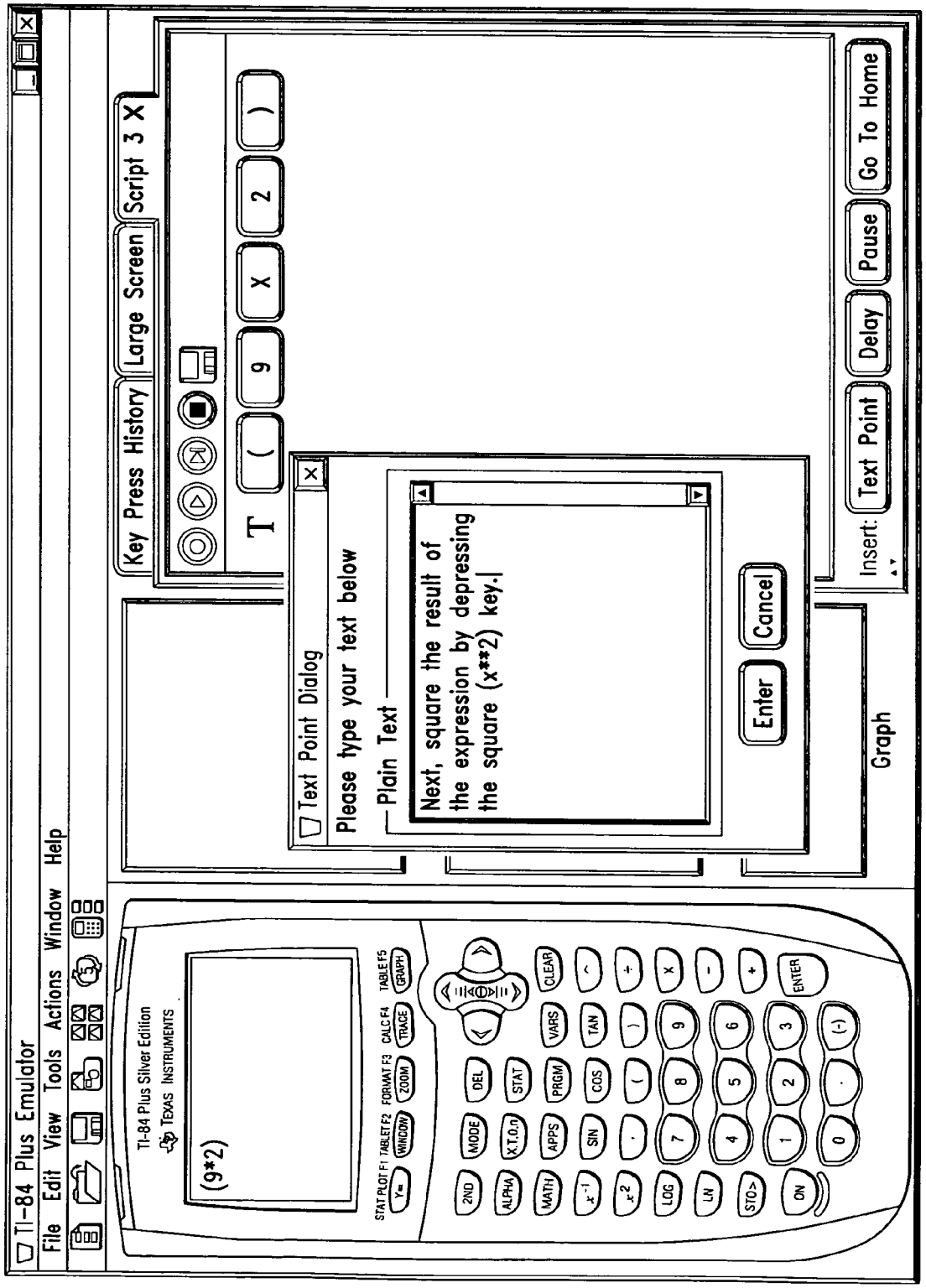
Figure 9:
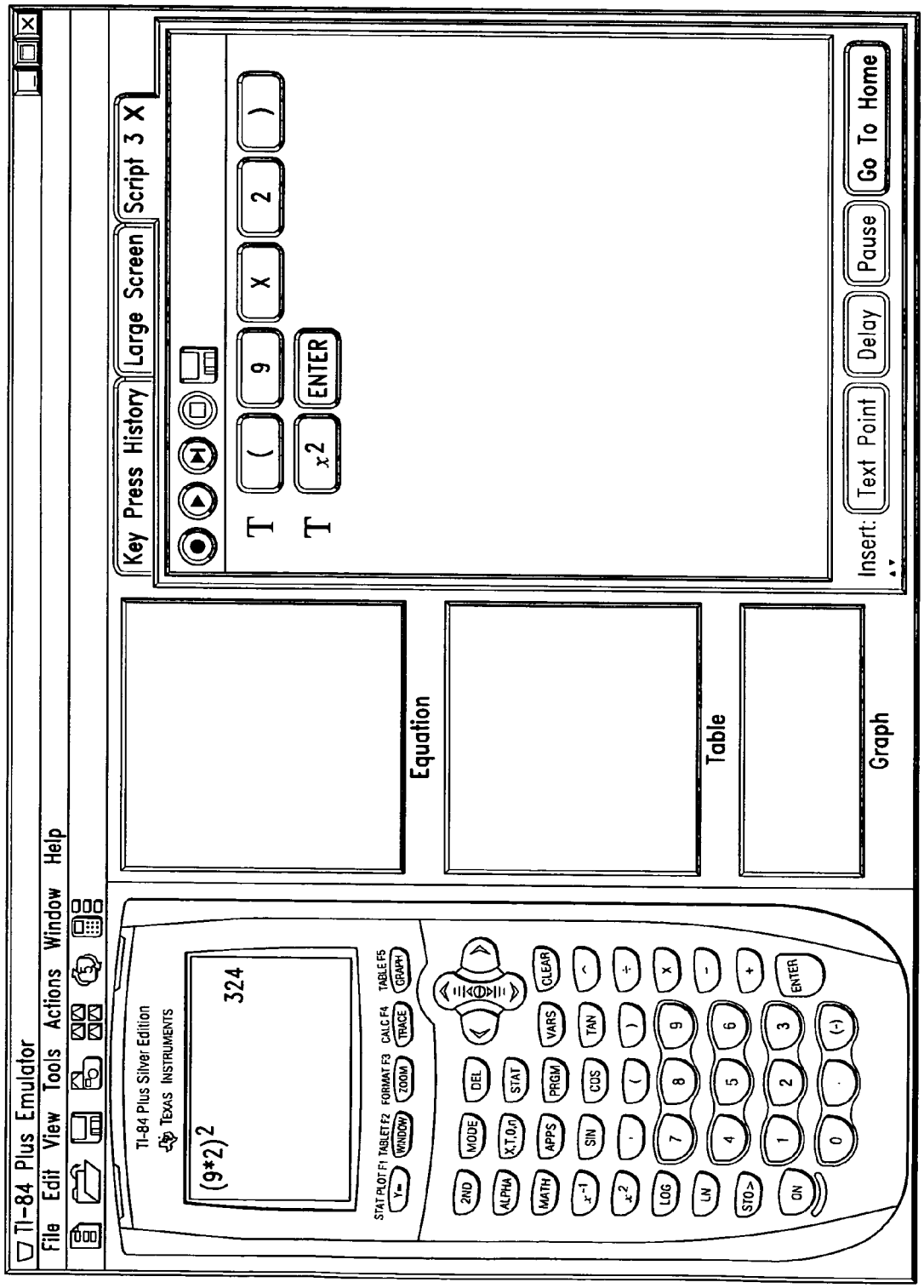

FIG. 7 illustrates the display after a first text annotation has been added and the expression "(9*2)" has been added. Next, in FIG. 8, a second text annotation is added. In this instance, the teacher explains that the expression entered will be squared. Finally, in FIG. 9, the script is completed by recording the "$x^2$" keystroke and the "Enter" keystroke.

Figure 10:
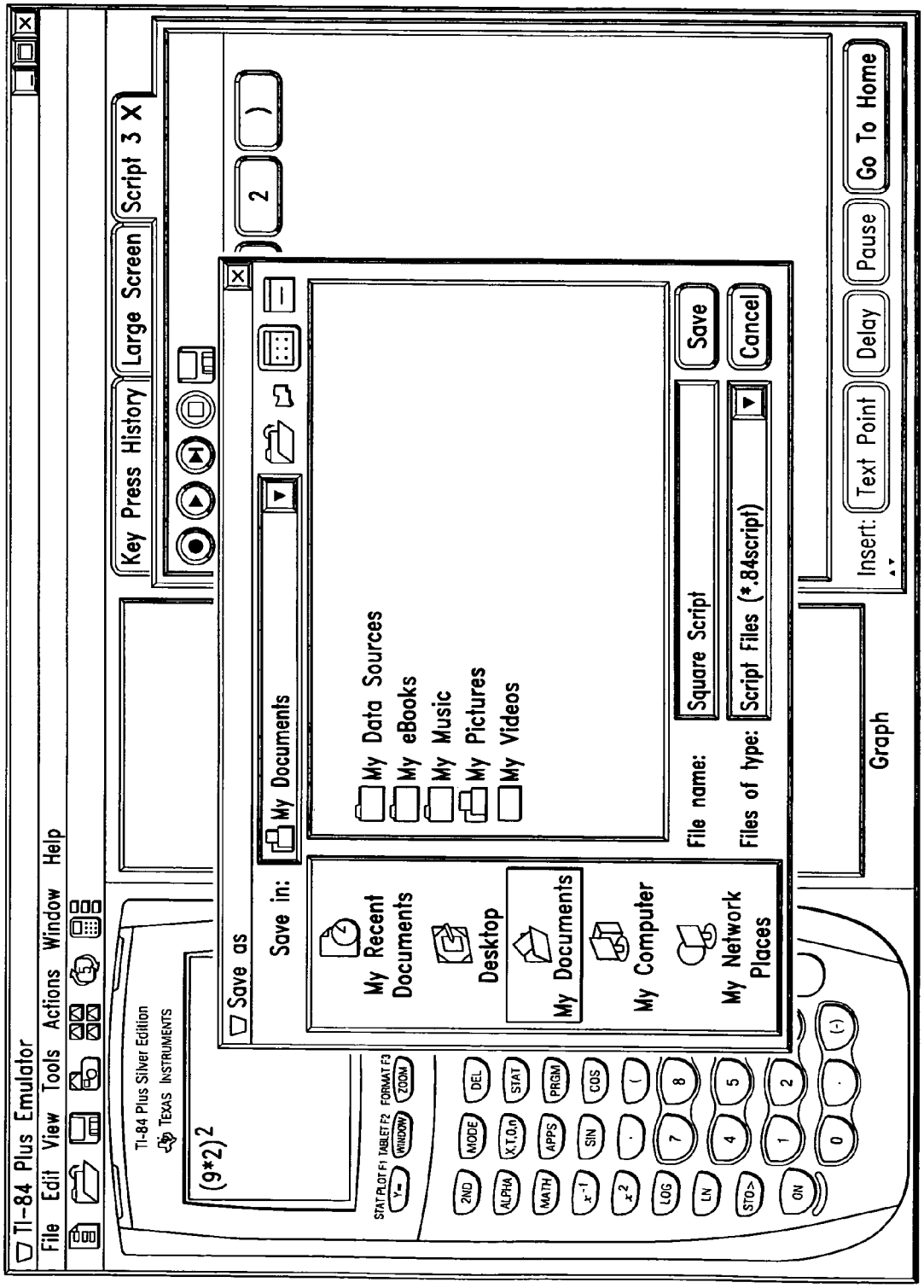

FIG. 10 illustrates that the script may be saved, for example, by selecting the save button 428 (FIG. 4). In this example, a Save As dialog box is presented to allow the user to select a location and filename for the saved script.

Figure 11:
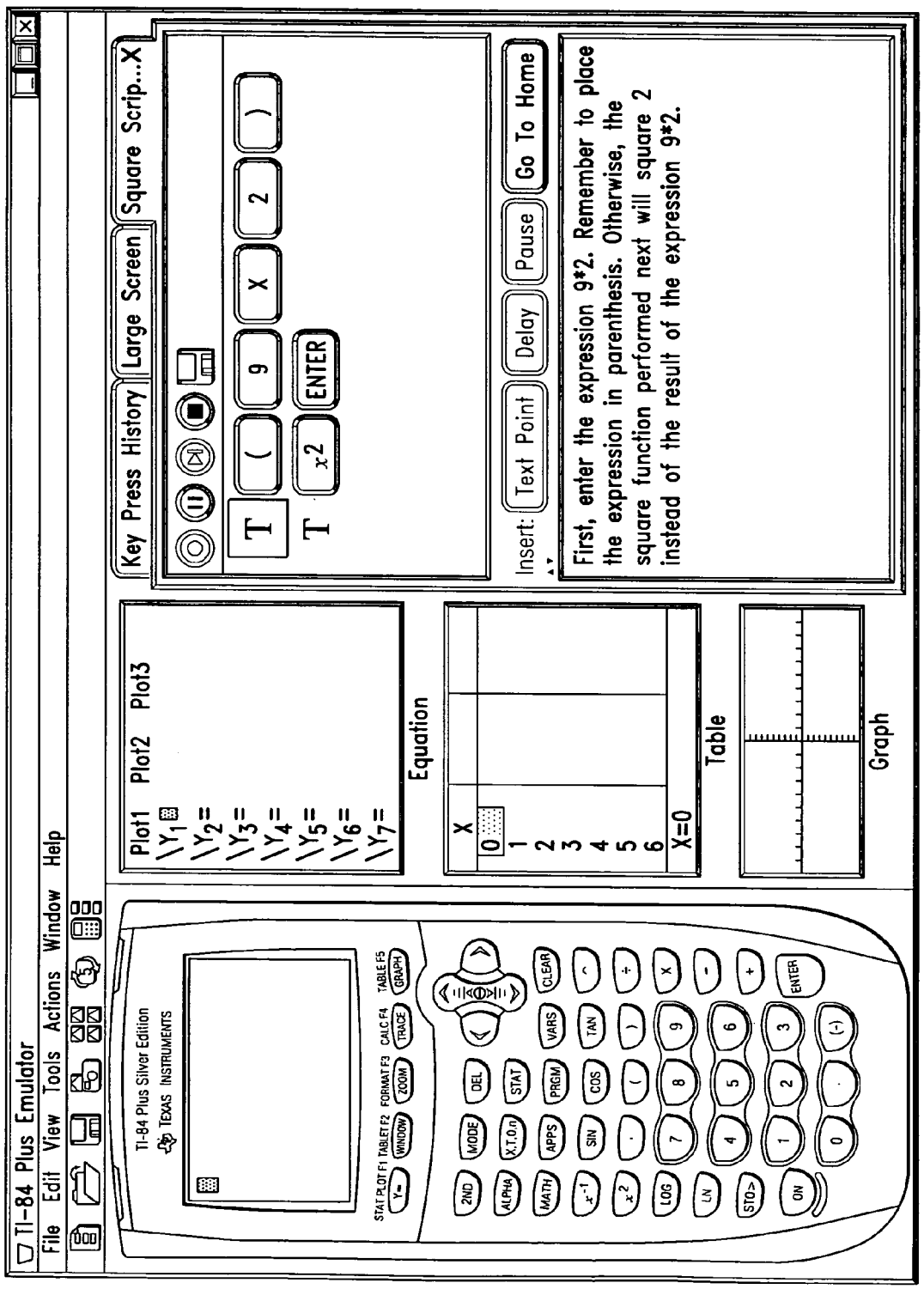
Figure 12:
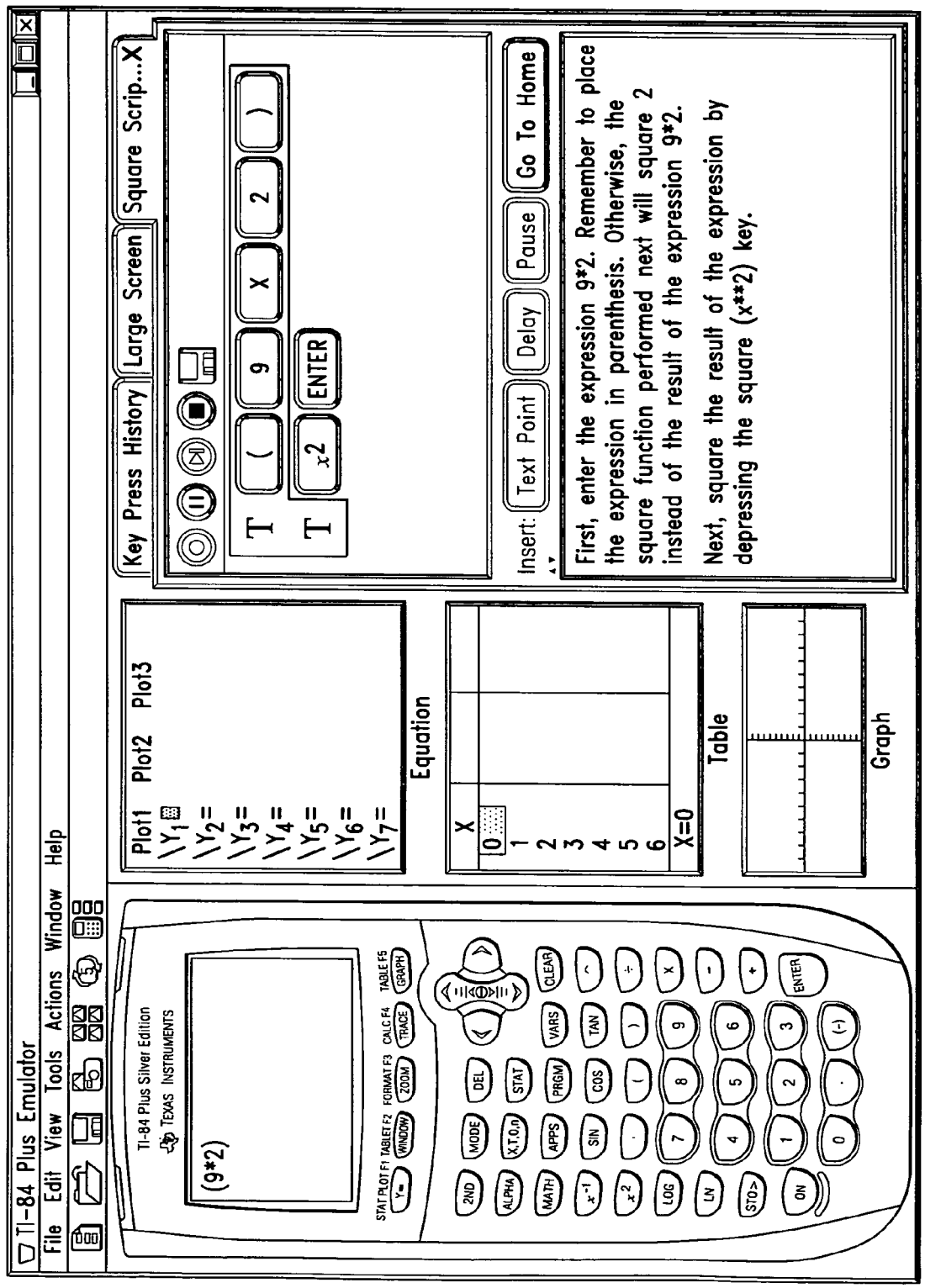
Figure 13:
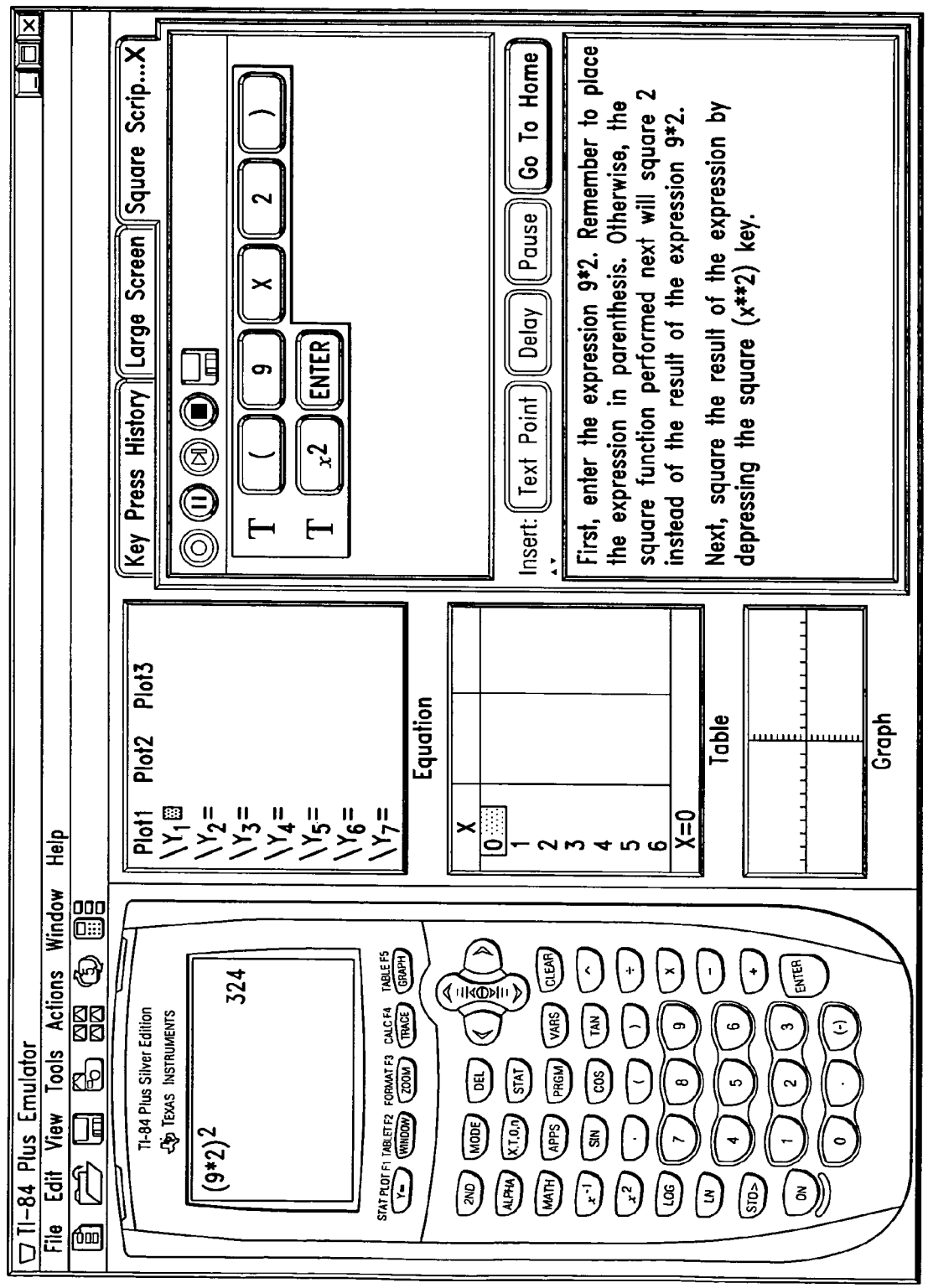

FIGS. 11-13 illustrate the playback of the script recorded as discussed above with reference to FIGS. 5-10 in accordance with an embodiment of the present invention. Referring first to FIG. 11, playback of the script is initiated, for example, by selecting the play button 422 (FIG. 4). The progress of the playback of the script is indicated in this example by a darkened or colored background behind the steps of the script that have been played. Thus, in FIG. 11, the first annotation step has been played. It should be noted that the text annotation that was entered during the record phase is played back in a window in the lower right-hand corner of the display.

In FIG. 12, the playback of the script continues such that the second annotation is also displayed in a window in the lower right-hand corner of the display. Note that the progress indicator (the colored background) has progressed to include the second annotation step. Lastly, the script is completed in FIG. 13.

One skilled in the art will appreciate that embodiments of the present invention may be used to record scripts that a student may use at a later time to study and review the concepts presented in the script. The ability to record and save the scripts allows teachers to record the scripts and to distribute them to a group of students for use at each student's convenience and as the need arises.

Although embodiments of the present invention and at least some of its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An emulation system comprising:
    a processor configured to perform mathematical operations, the mathematical operations corresponding to mathematical operations available on a handheld computing device;
    a display communicatively coupled to the processor; and
    memory communicatively coupled to the processor, the memory comprising a script, wherein the script is configured by an input sequence on the handheld computing device, stored, and performed at a later time, wherein the input further comprises an input annotation relating to at least one step of the script,
    wherein the processor executes the script at a later time and emulate behavior of the handheld computing device in accordance with playing of the script and the at least one input annotation.

2. The emulation system of claim 1, wherein the processor is configured to input the at least one input annotation.

3. The emulation system of claim 1, wherein the at least one input annotation is at least one of, text, graphics, audio or video.

4. The emulation system of claim 1, wherein the memory is configured to store computer program code to provide a step-through function, the step-through function causing the processor to perform a at least one of subset or a portion of at least one of the input sequence or the script.

5. The emulation system of claim 1, further comprising a graphical representation of the handheld computing device comprising a key corresponding to a keystroke of the input sequence being performed.

6. The emulation system of claim 1, wherein the hand held computing device comprises a calculator.

7. The emulation system of claim 1, wherein the handheld computing device comprises an electronic device configured to emulate a calculator.

8. A computer program product for recording a script for input to an emulator, the computer program product having a medium with a computer program embodied thereon, the computer program when executed performs:
    recording a script, the script comprising an input sequence corresponding to input entered on a handheld computing device, wherein the script is stored and preformed at a later time, and wherein the input comprises an input annotation relating to at least one step of the script;
    playing the script; and
    emulating behavior of the handheld computing device in accordance with the playing of the script.

9. The computer program product of claim 8, further comprising instructions for generating the at least one input annotation without inputting the input annotation.

10. The computer program product of claim 8, wherein the at least one input annotation is at least one of text, graphics, audio, or video.

11. The computer program product of claim 8, wherein the playing includes stepping through the input sequence.

12. The computer program product of claim 8, further comprising a graphical representation of the handheld computing device comprising a key corresponding to a keystroke of the input sequence being played.

13. The computer program product of claim 8, wherein the handheld computing device is a calculator.

14. A method of instruction of students in a classroom, the method comprising:
    displaying an output of an emulation device to a plurality of students, the emulation device emulating a calculator;
    receiving an input sequence, the input sequence corresponding to a plurality of keys located on the calculator;
    saving the input sequence as a script, wherein the script is preformed a later time; wherein the script comprises at least one input annotation that relates to at least one step of the script;
    retrieving the script; and emulating behavior of the calculator in accordance with the script.

15. The method of claim 14, wherein the receiving an input sequence includes receiving the input sequence from the calculator.

16. The method of claim 14, wherein the receiving an input sequence includes receiving the input sequence from an electronic device configured to emulate the calculator.

17. The method of claim 14, wherein the calculator is a graphing calculator.

18. The method of claim 14, further comprising annotating the script, the annotation being played in sequence in the step of emulating.

19. The method of claim 18, wherein the annotation includes one or more of text, graphics, audio, and video.

20. The method of claim 14, further comprising indicating on a graphical representation of the calculator a key corresponding to a keystroke of the input sequence being emulated.

* * * * *